April 14, 1936.  E. DOZLER  2,037,565

CONTROL SYSTEM

Filed May 11, 1934

Inventor:
Ernst Dozler,
by Harry E. Dunham
His Attorney.

Patented Apr. 14, 1936

2,037,565

UNITED STATES PATENT OFFICE 2,037,565

CONTROL SYSTEM

Ernst Dozler, Berlin-Charlottenburg, Germany, assignor to General Electric Company, a corporation of New York Application May 11, 1934, Serial No. 725,119
In Germany July 12, 1933

1 Claim. (Cl. 177—311)

This invention relates to control systems, more particularly to systems in which a control device and a controlled device are remotely located from each other, and it has for an object the provision of a simple, reliable and improved system of this character.

More specifically, the invention relates to control systems of this character in which indicating devices are provided at the control station to provide an indication of a condition of the controlled device, and a more specific object of the invention is the provision of means, both for exerting a controlling action and effecting a return indication or signal over a single circuit connection between the control station and the controlled object.

In carrying the invention into effect in one form thereof, an alternating voltage is applied to the circuit which extends between the control station and the controlled device, and rectifying devices, such for example as electric valves, are connected in circuit with the indicating or signal devices at the control station.

In illustrating the invention in one form thereof, it is shown as applied to a system for controlling the operation of a remotely located motor.

Figure 1:
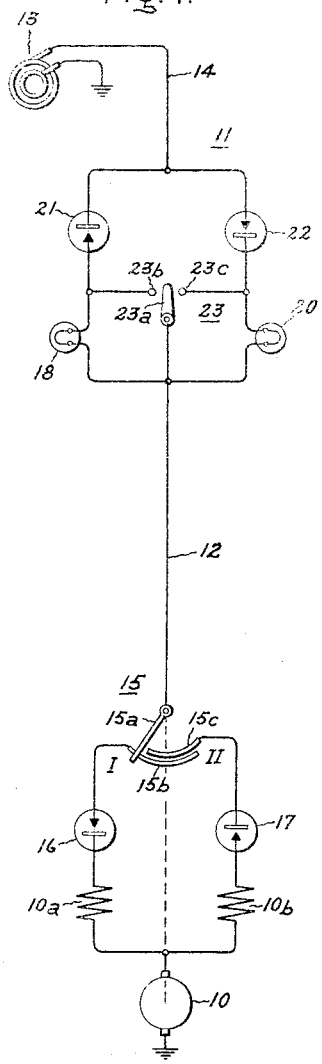
Figure 2:
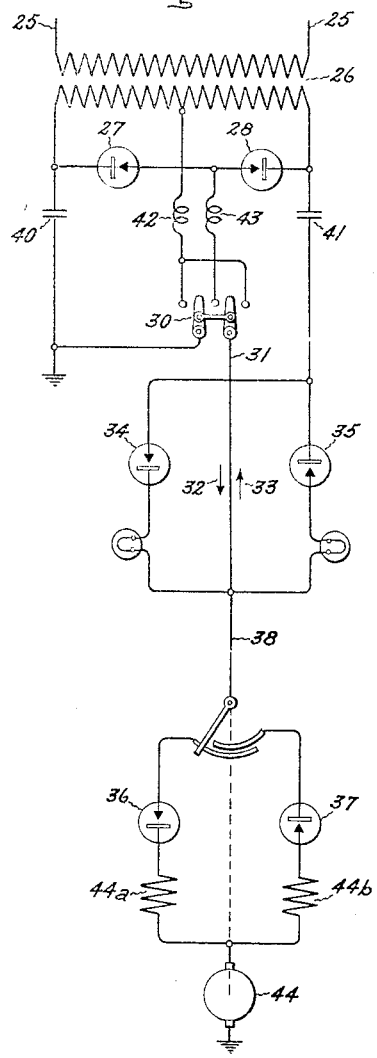

For a better and more complete understanding of the invention, reference should now be had to the following specification and to the accompanying drawing, of which Fig. 1 is a simple diagrammatical representation of an embodiment of the invention, and Fig. 2 is a simple diagrammatical representation of a modification.

Referring now to the drawing, an object, such for example as a motor 10, is controlled from a remotely located control station 11. A single circuit connection 12 extends between the control station 11 and the remotely located controlled object 10. An alternating voltage is supplied to this circuit from a source of alternating voltage, represented in the drawing by the conventionally illustrated alternating current generator 13, one terminal of which is connected to ground and the other terminal of which is connected by means of the conductor 14 to the control circuit connection.

At the opposite extremity of the controlled circuit, one terminal of the motor 10 is connected to ground and the opposite terminal is connected through split field windings 10a and 10b to a control device illustrated as a limit switch 15, which is illustrated as comprising a movable contact member 15a and a pair of stationary contact segments 15b and 15c which are arranged in overlapping relationship with each other as shown. Rectifying devices, such for example as the electric valves 16, 17, are respectively connected in the connections between each of the field windings 10a and 10b and the corresponding segments 15b and 15c of the limit switch 15. As shown, these electric valves 16, 17 are connected in reverse relationship. That is to say, they are so connected that they rectify respectively opposite half waves of an alternating voltage. For example, the valve 16 may be assumed connected for rectifying positive half waves of an alternating voltage and the valve 17 which is reversely connected will therefore rectify the negative half waves of this alternating voltage.

The movable contact member 15a of the limit switch is preferably connected through suitable speed reducing connections to the drive shaft of the motor 10 so as to rotate therewith. The position of the movable contact member 15a is therefore an indication of an operating condition of the motor 10, such for example as the amount of rotation in one direction or the other. When the movable contact member 15a is in its extreme left hand position it connects the electric valve 16 to the control conductor 12, whilst when this movable contact member is in its extreme right hand position it serves to connect the valve 17 to the control conductor 12. At the control station a plurality of indicating devices, such for example as the incandescent lamps 18, 20 are connected in parallel relationship with each other to the control conductor 12 and to the connection 14 leading to the alternating current source 13. These lamps 18, 20 are for the purpose of providing a signal or indication of an operating condition of the motor 10. Each of a pair of rectifying devices 21, 22 is respectively connected in series relationship between each of the indicating devices 18, 20 and the conductor 14. A control device illustrated as a switch 23 serves when its movable member 23a is moved into engagement with one or the other of the stationary contacts 23b, 23c to connect one or the other of the rectifiers 21, 22 to the control conductor 12 independently of the signal devices 18, 20. As shown, these rectifiers 21, 22 are connected reversely, i. e., they are connected for rectifying respectively opposite half waves of the alternating voltage supplied from the source 13. By the convention adopted in connection with the rectifying devices 16, 17, the rectifying device 22 is shown connected in such manner as to rectify positive half waves of the alternating voltage and the rectifying device 21 is connected for rectifying negative half waves of the alternating voltage.

As illustrated the motor 10 is in one of its limiting positions represented by the position I in which the movable contact member 15a of the limit switch is illustrated. The movable contact member 23a of the control switch is illustrated in its central position. In this position, the control conductor 12 is connected to the supply source 13 through both of the signal lamps 18, 20. The circuit is completed through the valves 16, the field winding 10a, the armature of the motor 10 and the return ground, by means of the movable contacts 15a of the limit switch in engagement with the stationary segment 15b. Since the valves 16 and 22 only pass the positive half wave of the alternating voltage only the single signal lamp 20 is illuminated. The illumination of this lamp indicates the actual limit of operation I of the motor 10. The lamp 18 remains dark, because the valve 16 suppresses the negative half cycles of the alternating voltage wave and the valve 17 which rectifies negative half cycles is disconnected from the control conductor 12 at the limit switch 15. The amount of current that can pass through the signal lamps 18, 20 is so small that the driving motor cannot be started up unintentionally by means of this current.

If the drive is moved from the limit of operation I to the opposite limit of operation II either by hand or by other external means, both motor fields 10a and 10b will be connected to the control conductor 12 during the greater part of the movement of the movable contact member 15a from position I to position II. The result of this is that both valves 16 and 17 rectify both half waves of the alternating voltage and consequently both signal lamps 18 and 20 receive current. That is to say, each of them will receive the half wave of current rectified and transmitted to it by its respectively associated valve 21 or 22. The illumination of both lamps will, therefore, indicate that the drive is in an intermediate position between operating limits.

When the drive has reached the position II the lamp circuit through the limit switch will only be closed through the valve 17 and the field winding 10b. Therefore, only the negative half cycles of the alternating voltage will be rectified and consequently only the signal lamp 18 will be illuminated through the valves 21, whereas the lamp 20 will be dark due to the suppression of the positive half cycles. That is, illumination of the lamp 18 alone indicates that the drive is at another limit of operation.

In order to operate the drive by means of the control switch 23, the movable contact member 23a is moved into that position corresponding to the desired operating condition. If, for example, it is desired to operate the drive from limit I to limit II, the contact 23a is moved into engagement with the stationary contact member 23c which short circuits the signal lamp 20 and thus the current strength of the rectified positive half waves of the alternating voltage will be sufficient to start the motor 10. The circuit is traced as follows: from one terminal of the generator 13, through the conductor 14, valve 22, contacts 23a and 23c, conductor 12, limit switch contacts 15a and 15b, valves 16, field winding and armature of the motor 10, and ground return to the generator 13. The negative half cycles of the alternating voltage are suppressed due to the fact that the valve 17 which rectifies negative half cycles is disconnected from the control conductor 12. However, even after the movable contact member 15a is operated to an intermediate position the negative half cycles of the voltage will continue to be suppressed, due to the fact that the movable contact member 23a of the control switch is in contact with the stationary contacts 23c and thus the negative half cycles must pass through the signal lamp 18. As a result, the current strength of the negative half cycle will be insufficient to have any effect on the motor 10 and the latter will continue to rotate in the direction corresponding to that in which the movable contact member 23a is originally moved. As the drive approaches the limiting position II, for which the control has been set, the movable contact member 15a is moved out of engagement with the stationary contact member 15b with the result that the valve 16 which rectifies positive half cycles of the alternating voltage is disconnected from the control conductor 12 and thus the motor 10 becomes deenergized and stopped. At this point, if the switch 23 is opened, the lamp 18 alone remains illuminated indicating that the drive is at the limit of operation II. This is readily understood from the foregoing description.

If the drive is to be operated in the reverse direction from limit II to limit I, the operation takes place in an analogous manner but in the reverse order.

In the event that the control switch 23 should be unintentionally moved to that control position corresponding to the position of the drive itself, this will have no effect. For example, assume the drive at rest in limiting position II, and the control switch 23 operated from its central position into engagement with the stationary contact members 23c. The circuit set up in this manner includes the valves 17 and 22 in series relationship with each other. Since the valve 22 will only pass positive half cycles and the valve 17 will only pass negative half cycles both half cycles of the alternating voltage will be effectively suppressed and the motor 10 will remain deenergized. The return signal remains unaffected by this unintentional operation because the signal circuit itself remains unchanged.

It will thus be seen that with but a single circuit connection between the control station and the controlled object, this system of connection provides a plurality of remote controlling operations of the controlled object together with a return signal indicating the operating condition of the controlled object.

If it is desired to effect the control by means of direct current, i. e., by utilizing both half waves of the alternating voltage, this may be accomplished by means of the connections illustrated in the modification of Fig. 2. The return signal, however, is provided by means of alternating current in the manner already described in connection with Fig. 1. In the modification of Fig. 2, the alternating voltage is derived from a suitable source represented by the two supply lines 25 by means of a transformer 26 to the terminals of the secondary winding of which a pair of electric valves 27 and 28 are provided for rectifying both half waves of the alternating voltage. The control switch 30 is illustrated in the form of a reversing switch by means of which the polarity of the control conductor 31 and the ground return conductor may be reversed. That is to say, with the control switch 30 operated to its left-hand position, the rectified current flows in one direction, which in this case is assumed to be the downward direction as represented by the arrow 32 whereas when the control switch 30 is operated to its right-hand position a current in the control conductor flows in the reverse or up direction as represented by the arrow 33. Respectively opposite half waves of the alternating voltage are conducted by the valves 34 and 35 respectively and by the valves 36 and 37 respectively in the same manner as that already described with reference to the system of Fig. 1. Thus the current flowing in the single circuit connection 38 between the control station and the controlled device may be considered as a resultant current comprising an alternating voltage superimposed upon the direct voltage. The condensers 40 and 41 are respectively included between the secondary terminals of the transformer 26 and the terminals of the signal circuit for the purpose of preventing the power current, which is a direct current from flowing in the signal circuit. Similarly, a pair of choke coils 42 and 43 are included in the direct current connection for the purpose of preventing the alternating voltage of the signal circuit from flowing in the transformer direct current power connections.

If the motor control or power portion of the installation is separately considered, it will be seen that the motor 44 in conjunction with its split field winding 44$_a$ and 44$_b$ operates upon a direct current obtained from the full wave rectifier and its direction of rotation depends of course upon the position to which the control switch 30 is moved. Similarly if the return signal circuits are separately considered it will be seen that these operate in the manner described in the foregoing description in connection with Fig. 1. In this case, the necessary alternating current is derived from the rectifier and transformer through the condensers 40 and 41. The apparatus and circuit arrangements are otherwise identical with those already described in connection with Fig. 1.

Although in accordance with the provisions of the patent statutes, this invention is described as embodied in concrete form; it will be understood that the apparatus and connections shown and described are merely illustrative and that the invention is not limited thereto since alterations and modifications will readily suggest themselves to persons skilled in the art without departing from the true spirit of this invention or from the scope of the annexed claim.

What I claim as new and desire to secure by Letters Patent of the United States, is:

A control system comprising in combination with an electric motor and a remote control station therefor, a single circuit connection from said control station to said motor, a source of alternating voltage connected to said circuit, a pair of rectifying devices connected in circuit with said motor for respectively rectifying opposite half waves of said voltage, a switching device operated by said motor for selectively connecting said rectifying devices to said circuit connection at predetermined limits of operation of said motor, a pair of indicating devices located at said control station and connected to said circuit connection, a second pair of rectifying devices, one connected in circuit with each of said indicating devices and both connected to said source for rectifying respectively opposite half waves of said voltage to provide selective energization of said indicating devices dependent upon the operation of said switching device, and a control device for selectively connecting one of said second pair of rectifying devices to said circuit connection independently of said indicating devices thereby to provide operation of said motor in a selected direction.

ERNST DOZLER.